United States Patent [19]

Asano et al.

[11] 4,226,633

[45] Oct. 7, 1980

[54] RAW COMPOSITION FOR CARBON ARTICLES

[75] Inventors: Kiro Asano; Fumio Tamura; Yoshio Kawai, all of Tokyo; Kiyoshi Yamaki, Fuchu, all of Japan

[73] Assignee: Kureha Kagaku Kogyo Kabushiki Kaisha, Tokyo, Japan

[21] Appl. No.: 923,647

[22] Filed: Jul. 3, 1978

Related U.S. Application Data

[60] Division of Ser. No. 665,049, Mar. 8, 1976, abandoned, which is a continuation of Ser. No. 459,845, Apr. 10, 1974, abandoned.

[30] Foreign Application Priority Data

Apr. 14, 1973 [JP] Japan .................................. 48-42590

[51] Int. Cl.$^3$ ............................ C08L 95/00; C08J 9/24
[52] U.S. Cl. .................................... 106/269; 106/278; 106/279; 264/29.6
[58] Field of Search ................... 106/269, 284, 38.8, 106/38.7, 56, 278, 279; 208/4, 22, 6; 264/29.1, 105

[56] References Cited

U.S. PATENT DOCUMENTS

| | | | |
|---|---|---|---|
| 2,686,728 | 8/1954 | Wallace | 106/38.8 X |
| 2,699,997 | 1/1955 | Hardman et al. | 106/38.8 |
| 2,870,031 | 1/1959 | Benziger | 106/56 |
| 3,141,783 | 7/1964 | Weaver et al. | 106/56 X |
| 3,196,022 | 7/1965 | Weaver | 106/38.8 |
| 3,350,295 | 10/1967 | Hamner et al. | 106/284 X |
| 3,382,084 | 5/1968 | Folkins et al. | 106/284 |
| 3,801,342 | 4/1974 | Berber et al. | 106/284 |
| 3,854,962 | 12/1974 | Speyer | 106/38.8 X |
| 3,878,087 | 4/1975 | Kawai et al. | 208/22 |
| 3,991,169 | 11/1976 | Marita et al. | 264/29.3 |

*Primary Examiner*—Theodore E. Pertilla
*Attorney, Agent, or Firm*—Frishauf, Holtz, Goodman & Woodward

[57] ABSTRACT

A process for manufacturing homogeneous and low porosity carbon articles of great mechanical strength from a composition including a sinterable mother material and an additive selected from the group consisting of hydrocarbons, fatty acids, esters and salts of fatty acids, organic compounds having OH functional groups and mixtures thereof, wherein the mother material has an H/C atomic ratio of 0.3 to 0.75, a fixed carbon value of 55 to 96% and does not flow out of a 1 mm diameter nozzle at a temperature of 300° C. under a load of 10 kg/cm$^2$; and the additive has a fixed carbon value of 20% at most, a boiling or decomposition point of at least 150° C. and becomes fluid at a temperature of at least 100° C.

17 Claims, No Drawings

RAW COMPOSITION FOR CARBON ARTICLES

This is a division of application Ser. No. 665,049, filed Mar. 8, 1976 (now abandoned), which, in turn, is a continuation of prior application Ser. No. 459,845, filed Apr. 10, 1974 (abandoned).

This invention relates to a raw composition for carbon articles and more particularly to a raw composition for manufacturing homogeneous and dense carbon articles of great mechanical strength.

Carbon articles are good electric conductors and excellent in various physical properties, for example, refractoriness, thermal shock resistance, mechanical wear resistance and chemical corrosion resistance and, what is better, have little weight. In recent years therefore, great hope is pinned on the development of homogeneous and low porosity carbon articles of great mechanical strength.

As is well known, carbon articles have hitherto been manufactured by molding a raw composition containing roasted coke as an aggregate and pitch or coal tar as a binder and carbonizing and finally graphitizing the molding. However, the prior art carbon article is generally accompanied with the drawbacks that coke essentially has weak mechanical strength due to its defective internal physical construction, during carbonization, the aggregate and binder are separated at the interface and the binder gives rise to flowing, foaming and shrinkage, thus causing the carbon article to present structural defects such as nonhomogeneity and porosity. To eliminate these difficulties, the customary practice has been to impregnate the pores of a carbonized raw composition with pitch or tar and increase the density of the mass by further carbonization. However, this process is complicated as a whole, still failing to provide a satisfactory product.

The known homogeneous carbon articles of great mechanical strength include glassy carbon articles obtained from a thermosetting resin such as phenolic resins, pitch carbon articles prepared from special denatured pitch, and mesocarbo articles produced from a spherulite of pitch condensate. These conventional carbon articles which are free from a binder indeed have very prominent mechanical strength and hardness, but still pose unsettled problems from the standpoints of moldability, carbonizability, workability, possibility of quantity production and economics. Accordingly, the above-mentioned homogeneous carbon articles are still in the stae of research though much is expected therefrom, or are only produced on a laboratory scale. Therefore, strong demand has been made for a raw composition capable of providing such a homogeneous carbon article of great mechanical strength as can most all the above-mentioned requirements.

It is accordingly an object of this invention to provide a raw composition for carbon articles fully eliminating the necessity of impregnating pitch or tar.

Another object of this invention is to provide a raw composition for carbon articles which give forth various physico-chemical properties unattainable by any prior art coke-based carbon article and further settles all problems of manufacture whose resolution has been impossible with the conventional carbon article made of the so-called homogeneous carbon.

According to an aspect of this invention, there is provided a raw composition for manufacturing homogeneous and low porosity carbon articles of great mechanical strength comprising a sinterable mother material and an additive selected from the group consisting of hydrocarbons, fatty acids, esters and salts of fatty acids, organic compounds having OH functional groups, and mixtures thereof, wherein the mother material has an N/C atomic ratio of 0.3 to 0.75, a fixed carbon value of 55 to 96% and a flow temperature of at least 300° C. and the additive has a fixed carbon value of 20% at most and a boiling or decomposition point of at least 150° C., and becomes fluid at a temperature of at least 100° C.

A raw composition for manufacturing homogeneous and low porosity carbon articles of great mechanical strength according to the invention contains a mother material and an additive. The mother material is generally a pitchy substance formed of a polycyclic aromatic compound, and has a fixed carbon value of 55 to 96% and a flow temperature of at least 300° C. The mother material contains hydrogen atoms and carbon atoms whose numbers bear the ratio (H/C atomic ratio) of 0.3 to 0.75, and is further preferred to include more than 90% benzene insolubles. When baked, such mother material has a nature to be fused together without deformation (this nature is hereinafter referred to as the sinterability of the mother material).

As used herein, the term "fixed carbon value" is defined to mean a residue obtained by heating a sample from room temperature to 1000° C. in increments of about 10° C./min. in a nonoxidizing atmosphere. The term "flow temperature" is defined to mean the temperature at which a 1 gram sample filled in a 10 mm diameter cylinder having a 1 mm diameter nozzle fitted to the lower end thereof begins to melt and flow out of the nozzle when externally heated in increments of 5° to 15° C./min. under a load of 10 Kg/cm$^2$.

Where the mother material has a smaller fixed carbon value than 55%, it presents a prominent shrinkage during carbonization, causing the resultant molding to be often undesirably broken. When said fixed carbon value exceeds 96%, the mother material decreases in sinterability. Where the H/C atomic ratio is smaller than 0.3, the mother material is also reduced in sinterability. Where said H/C rises above 0.75, the mother material is undesirably softened during sintering or carbonization, with resultant foaming. Also where the flow temperature falls to below 300° C., the mother material is undesirably softened, following by foaming.

The mother material is prepared from tar or pitch through the processes of heat treatment, for example, distillation and thermal polycondensation at 350°0 C. to 550° C.; chemical treatment for example, oxidation and catalytic polycondensation; and extraction treatment, for example, elimination of unnecessary components by an organic solvent. Before being used in practice, the mother material obtained by such treatment is pulverized to a particle size of less than 250μ (60 mesh pass) and, where required, by blending various particle sizes. Further, the mother material may be used in the form of short fibers. The kinds and shapes of the mother material change the degree of graphitizing a final carbon product and its internal structure, as later described.

The mother material thus prepared, however, has low moldability, resulting in low workability and carbonization characteristics of the resultant molding. For example, where there is provided a large carbon article having as low a porosity as less than 10%, then the mother material, if used alone, has to be molded at a higher pressure than 1.3 ton/cm$^2$, leading to the occurrence of strains and consequent cracks immediately after molding or in the initial period of baking, thus failing to provide a desired carbon article. We have discovered that the above-mentioned drawbacks can be eliminated without losing the properties of the mother material by adding a certain additive thereto. The additive is an organic material fluid at a temperature of at least 100° C., a boiling and/or decomposition point of at least 150° C., as the case may be, and a fixed carbon value of 20% at most. The additive is selected from the group consisting of organic compounds having OH functional groups in the molecule, for example, ethylene glycol, propylene glycol, glycerine, cyclohexanol, lauryl alcohol, decyl alcohol, cetyl alcohol, polyethylene glycol, polypropylene glycol and polyvinyl alcohol; higher fatty acids such as lauric acid, myristic acid, palmitic acid, stearic acid and oleic acid and esters (such as glycerine ester) and metal salts thereof; and hydrocarbons such as liquid paraffin, lubricating oil, light oil, coal tar, naphthalene, alkyl naphthalene, anthracene oil and bottom oil obtained as by-product from manufacture of olefins, such as ethylene bottom oil.

The above-listed additives at room temperature generally take the form of liquid, wax, or solid having a lubricating nature, and are very wettable with the mother material. Particularly, those additives which are present in the form of a liquid or wax at room temperature facilitate the flow of the mother material when molded at room temperature and elevate the packing density of the molding. Where the additive has a lower boiling or decomposition point than 150° C., then cracks appear on the surface of the molding. Further, where the additive does not become fluid at a temperature of at least 100° C., the molding can not be saved from internal residual strains when molded, but is also subjected to shrinkage in the initial period of carbonization, thus eventually giving rise to the breakage of a product. Where the additive has a larger fixed carbon value than 20%, then the resultant product undesirably loses homogeneity, and moreover often foams during baking.

The above-mentioned additives may be used alone or in mixtures. It is further possible to incorporate other components, for example, water or lower alcohols in a raw composition, insofar as the function of the composition is not obstructed.

The additive is uniformly mixed with the mother material by a blender or mixer or by application of a solvent. Though varying with the molding method used, the ratio in which the additive is mixed with the mother material is roughly chosen to be 100 parts by weight for the mother material and 3 to 60 parts by weight for the additive. However, it is preferred to blend the additive in 5 to 35 parts by weight in case of a cast molding and 35 to 60 parts by weight in case of an extrusion molding. Regardless of the molding method, it is desired for moldability and carbonizability to mix an additive of polyethylene glycol or polypropylene glycol to a mother material obtained by oxidation and a hydrocarbon additive such as coal tar, anthracene oil or naphthalene to a mother material prepared by thermal polycondensation without oxidation.

A raw composition thus obtained is molded into a desired shape by a known molding method, for example, cast molding or extrusion molding, and thereafter baked at 1000° to 2800° C. in a nonoxiding atomsphere for carbonization and/or grahitization, thereby readily providing a carbon article having the homogeneity and mechanical strength adapted for an intended object.

A raw composition according to this invention for carbon articles which consists of the aforesaid mother material and additive displays the following surprising effects:

I. Features of a carbon article obtained:

(1) Homogeneous because the carbon article is prepared by sintering of the mother material substantially alone.

(2) The internal structure of the carbon article can vary with the form of the mother material used. As determined by X-rays, a fibrous mother material provides an anisotropic carbon article, while a powdery or particulate mother material offers an isotropic product.

(3) A carbon article obtained has an extremely low porosity because of the mutual fusion of the mother material taking place during the carbonization of a nonbaked molding. The pores present in the carbon article have extremely small particle sizes which indicate a very sharp distribution, thus rendering the product prominently compact.

(4) The mutual firm bonding of the mother material and the low porosity of the product attain a very great mechanical strength of said product.

(5) Various kinds of mother material avaiable for use provide a carbon article prepared with any desired degree of graphitization. For example, a hard carbon article is produced from the mother material heat treated in the air, and a soft carbon article is obtained from the mother material heat treated in a nonoxidizing atmosphere, for example, that of nitrogen.

II. Advantages of this invention in manufacturing carbon articles:

(1) The organic source of the other material, the lubricity of the additive and its wettability with the mother material jointly enable a raw composition to be molded not only with great ease but also without the necessity of applying so high a pressure as in molding the mother material alone.

(2) The interaction or synergistic effect of the mother material and additive renders the nonbaked molding of a raw composition according to this invention extremely tough and tenacious. Accordingly, the nonbaked molding is easy to handle, little subject to waste resulting from breakage, and readily workable.

Since a carbon article obtainable from a raw composition according to the invention has prominent mechanical strength and hardness and is not easy for cutting work, the cuttability of the nonbaked molding offers great advantage from the standpoint of productivity and economies. The carbon article obtained from the raw composition according to the invention has a hardness well comparable with that of a prior art glassy carbon article and does not substantially admit of any machine work, once it is baked.

(3) As mentioned above, the nonbaked molding is tough and tenacious, preventing cuttings produced during machining from being scattered around with resultant contamination of the work site condition.

(4) The machining waste of the nonbaked molding is available for reuse.

(5) A baked body obtained from a raw composition according to the invention is sufficiently compact to eliminate the impregnation of, for example, pitch customarily applied in attaining the high density of a carbon article.

(6) The thermal characteristics of the mother material and additive, for example, fluidity and wettability during heating minimize the occurrence of strains in the interior of a nonbaked molding in the initial period of carbonization, making it possible for the nonbaked molding to be baked into a carbon article having any desired shape and size without suffering any breakage.

(7) The possiblity of preparing the mother material generally from tar or pitch offers great industrial advantage.

As mentioned above, this invention provides a carbon article which can display such excellent qualities as are unattainable with the prior art coke-based product and resolve various problems obstructing the manufacture of the so-called homogeneous carbon article.

Carbon articles prepared from a raw composition according to this invention are widely applicable as mechanical carbon articles including high grade articles slidable at high pressure and peripheral speed, electrical carbon articles such as electrical machine brushes and electrodes, and further as chemical carbon articles required to have corrosion resistance and impermeability to chemicals.

This invention will be more fully understood with reference to the examples which follow, though the invention is not limited thereto.

EXAMPLE 1

Ethylene bottom oil was distilled to provide a pitch having a softening point of 210° C., from which samples a to e of mother material were prepared under the conditions given in Table 1 below.

TABLE 1

| Sample | Conditions in which powders of pitch pulverized to smaller sizes than 20 microns were heat treated | C (wt %) | H (wt %) | O (wt %) | H/C | Fixed carbon value (wt %) | Benzene insolubles (wt. %) |
|---|---|---|---|---|---|---|---|
| a | 16 hrs at 200° C. in the air | 84.52 | 4.02 | 11.46 | 0.571 | 74.0 | 91.1 |
| b | 3 hrs at 200° C. and 1 hr at 240° C. in the air | 80.54 | 3.46 | 16.00 | 0.515 | 73.4 | 98.0 |
| c | 1 hr at 200° C. and 3 hrs at 260° C. in the air | 75.24 | 2.62 | 22.14 | 0.418 | 68.8 | 99.0 |
| d | 35 hrs at 400° C. in nitrogen | 94.32 | 4.13 | 0.95 | 0.522 | 89.00 | 100 |
| e | 3 hrs at 400° C. and further heated up to 490° C. in nitrogen | 95.21 | 3.03 | 1.73 | 0.382 | 95.97 | 100 |

Notes: The samples a to e of mother material did not flow out of the 1 mm diameter nozzle of the flow tester at 300° C. under a load of 10 Kg/cm$^2$.

Next, the same kinds of samples a to e as listed above were pulverized to smaller particle sizes than 10 microns. Various additives were homogeneously blended with the samples in amounts set forth in Tables 2 to 4 based on 100 parts by weight of mother material to form a raw composition. Determination was made of the moldability, carbonizability and graphitizability of the samples 1 to 50. The samples were formed by cast molding into parallelepiped bodies measuring 150 mm×150 mm×50 mm under the conditions set forth in Tables 2 to 4. Each sample molding was buried in coke breeze and heated from room temperature to 1000° C. in increments of 7.5° C./hr for carbonization. The results are shown in Tables 2 to 4.

TABLE 2

Characteristics of a raw composition containing as an additive an organic compound having OH functional groups in the molecule

| Sample No. | Mother material (100 parts) | Additive* Kind | Additive* Parts | Molded Molding pressure (kg/cm$^2$) | Molded Bulk density (g/cm$^3$) | Molded Compression strength (Kg/cm$^2$) | Baked Fixed carbon value (wt%) | Baked Volume shrinkage (vol %) | Baked Bulk density (g/cm$^3$) | Baked Porosity (vol%) | Baked Bending strength** (Kg/cm$^2$) | Graphitizability*** d(002) A |
|---|---|---|---|---|---|---|---|---|---|---|---|---|
| Control 1 | a | | 0 | 600 | 1.032 | 40 | 71.2 | 38.8 | 1.249 | 22.5 | 550 | |
| Control 2 | a | | 0 | 800 | 1.034 | 110 | 74.0 | 38.6 | 1.306 | 18.3 | 600 | 3.41 |
| Control 3 | a | | 0 | 1000 | Cracks formed perpendicular to the direction of molding | | | | | | | |
| Control 4 | a | | 0 | 1500 | Cracks formed perpendicular to the direction of molding | | | | | | | |
| 5 | a | PEG 400 | 5 | 600 | 1.14 | 210 | 71 | 44.0 | 1.35 | 12.6 | 900 | |
| 6 | a | | 15 | 600 | 1.30 | 215 | 64 | 45.2 | 1.40 | 2.0 | 1350 | 3.45 |
| 7 | a* | | 20 | 600 | 1.32 | 190 | 61.5 | 46.5 | 1.52 | =0 | 1410 | — |
| 8 | a | PEG 1500 | 30 | 400 | 1.30 | 170 | 55 | 51.6 | 1.52 | =0 | 1420 | — |
| Control 9 | b | | 0 | 800 | 1.103 | 90 | 73.8 | 35.7 | 1.270 | 23.6 | 490 | 3.41 |
| 10 | b | EG | 15 | 600 | 1.28 | 200 | 63.5 | 14.8 | 1.48 | 6.1 | 950 | 3.43 |
| Control 11 | c | | 0 | 800 | 1.112 | 60 | 68.9 | 35.6 | 1.199 | 33.0 | 390 | 3.40 |
| 12 | c | PG | 15 | 600 | 1.28 | 198 | 56.0 | 45.4 | 1.42 | 16.6 | 750 | 3.42 |
| 13 | c | CY | 15 | 600 | 1.25 | 179 | 56.1 | 45.3 | 1.421 | 16.0 | 763 | — |
| Control 14 | d | | 0 | 800 | 1.11 | 70 | 89.0 | 36.3 | 1.402 | 33.5 | 500 | 3.36 |
| 15 | d | POPG | 13 | 600 | 1.26 | 210 | 78.6 | 51.8 | 1.71 | 9.4 | 1120 | 3.37 |
| Control 16 | c | POPG | 0 | 1000 | Broken after molded | | | | | | | |

TABLE 2-continued

Characteristics of a raw composition containing as an additive an organic compound having OH functional groups in the molecule

| | Mother material | Additive* | | Molded | | | Baked | | | | Graphiti- |
| | | | | Molding pressure | Bulk density | Compression strength | Fixed carbon value | Volume shrinkage | Bulk density | Porosity | Bending strength** | zability*** |
| Sample No. | (100 parts) | Kind | Parts | (kg/cm$^2$) | (g/cm$^3$) | (Kg/cm$^2$) | (wt%) | (vol %) | (g/cm$^3$) | (vol%) | (Kg/cm$^2$) | d(002) A |
|---|---|---|---|---|---|---|---|---|---|---|---|---|
| 17 | c | G | 25 | 600 | 1.31 | 120 | 69.0 | 52.0 | 1.68 | 9.6 | 680 | 3.36 |

Note:
PEG-400:Polyethylene glycol having an average molecular weight of 400, liquid
PEG-1500:Polyethylene glycol having an average molecular weight of 1500, wax form
EG: Ethylene glycol, liquid
PG:Propylene glycol, liquid
POPG:Polyoxypropylene glycol, liquid
G:Glycerine, liquid
CY:Cyclohexanol, liquid
**Compression test: ASTM D 695 (Sample size:1" × ½" × ½")
Bending test: ASTM D 790 (Sample size: ½" × ½" ×3")
***Graphitizability was expressed in a distance (d(002)) between two adjacent (002) planes as measured by X-ray analysis of a sample heat treated at 2800° C. The larger d(002), the lower the graphitizability. The d(002) is 3.54A for graphite. A larger d(002) than 3.4A represents a material which is generally considered difficult to graphitize.

The above-listed additives indicated fluidity at a temperature of at least 100° C., boiled or decomposed at a temperature of at least 150° C., and had a fixed carbon value of substantially 0% at 1000° C. when heated from room temperature at the rate of 10° C./min. in nitrogen.

The above-listed additives indicated fluidity at a temperature of at least 100° C., boiled or decomposed at a temperature of at least 150° C. and had a fixed carbon value of substantially 0% at 1000° C. when heated from room temperature at the rate of 10° C./min. in nitrogen.

Table 3

Characteristics of a raw composition containing fatty acid as an additive

| | Mother material | Additive* | | Molded | | | Baked | | | | Graphiti- |
| | | | | Molding pressure | Bulk density | Compression strength** | Fixed carbon value | Volume shrinkage | Bulk density | Porosity | Bending strength** | zability d(002) |
| Sample No. | (100 parts) | Kind | Parts | (kg/cm$^2$) | (g/cm$^3$) | (kg/cm$^2$) | (wt %) | (vol %) | (g/cm$^3$) | (vol %) | (kg/cm$^2$) | A |
|---|---|---|---|---|---|---|---|---|---|---|---|---|
| Control 18 | a | | 0 | 600 | 1.032 | 10 | 74.2 | 38.8 | 1.249 | 22.5 | 550 | — |
| Control 19 | a | | 0 | 800 | 1.084 | 110 | 74.0 | 38.6 | 1.306 | 18.3 | 600 | 3.41 |
| Control 20 | a | | 0 | 1000 | Cracks formed perpendicular to the direction of molding | | | | | | | | |
| 21 | a | SA | 5 | 800 | 1.20 | 170 | 71 | 44.1 | 1.440 | 5.5 | 1200 | — |
| 22 | a | SA | 15 | 600 | 1.27 | 240 | 64.2 | 45.3 | 1.487 | 2.2 | 1290 | 3.46 |
| 23 | a | SA | 30 | 600 | 1.30 | 190 | 57.2 | 49.8 | 1.520 | — | 1330 | — |
| Control 24 | b | | 0 | 800 | 1.103 | 90 | 73.8 | 35.7 | 1.270 | 23.6 | 490 | 3.41 |
| 25 | b | SA | 15 | 800 | 1.27 | 230 | 64.2 | 45.2 | 1.486 | 5.8 | 915 | — |
| 26 | b | SA | 15 | 800 | 1.26 | 225 | 64.8 | 65.1 | 1.480 | 6.1 | 890 | — |
| 27 | b | PA | 15 | 800 | 1.27 | 230 | 64.1 | 45.1 | 1.490 | 5.36 | 920 | — |
| Control 28 | c | | 0 | 800 | 1.112 | 60 | 68.9 | 35.6 | 1.199 | 33.0 | 380 | 3.40 |
| 29 | c | PA | 15 | 300 | 1.29 | 198 | 56.0 | 15.3 | 1.435 | 15.1 | 820 | — |
| Control 30 | d | | 0 | 800 | 1.110 | 70 | 39.0 | 36.3 | 1.402 | 33.5 | 420 | 3.36 |
| 31 | d | SA | 15 | 800 | 1.24 | 158 | 79.0 | 51.2 | 1.654 | 12.4 | 1100 | — |
| Control 32 | a | | 0 | 1000 | | | Broken after molded | | | | | — |
| 33 | e | OA | 30 | 1000 | 1.31 | 118 | 70.5 | 51.9 | 1.697 | 10.2 | 710 | 3.36 |

Note:
*RA: Lauric acid, wax form
MA: Myristic acid, wax form
PA: Palmitic acid, wax form
SA: Stearic acid, wax form
OA: Oleic acid, wax form
**Compression test: ASTM D 695 (Sample size: 1" × ½" × ½")
Bending test: ASTM D 790 (Sample size: ½" × ½" × 3")

TABLE 4

Characteristics of a raw composition containing hydrocarbon as an additive

| | Mother material | Additive* | | Molded | | | Baked | | | | Graphiti- |
| | | | | Molding pressure | Bulk density | Compression strength* | Fixed carbon value | Volume shrinkage | Bulk density | Porosity | Bending** strength | zability d(002) |
| Sample No. | (100 parts) | Kind | Parts | (kg/cm$^2$) | (g/cm$^3$) | (kg/cm$^2$) | (wt %) | (vol %) | (g/cm$^3$) | (vol %) | (kg/cm$^2$) | A |
|---|---|---|---|---|---|---|---|---|---|---|---|---|
| Control 34 | a | | 0 | 600 | 1.032 | 40 | 7.42 | 38.8 | 1.249 | 22.5 | 550 | 3.41 |
| Control 35 | a | | 0 | 800 | 1.084 | 110 | 74.0 | 38.6 | 1.306 | 18.3 | 600 | — |
| Control 35 | a | | 0 | 1000 | Cracks formed perpendicular to the direction of molding | | | | | | | | |
| 37 | a | LP | 5 | 600 | 1.12 | 180 | 71.0 | 44.0 | 1.320 | 15.3 | 750 | — |
| 38 | a | LP | 15 | 400 | 1.28 | 190 | 64.2 | 45.1 | 1.499 | 1.4 | 1300 | 3.45 |
| 39 | a | LP | 30 | 300 | 1.30 | 140 | 57.0 | 50.0 | 1.520 | 0 | 1400 | — |
| Control 40 | b | | 0 | 800 | 1.103 | 90 | 73.8 | 35.7 | 1.270 | 23.6 | 490 | 3.41 |

TABLE 4-continued

| | | | | Molded | | | Baked | | | | | Graphiti- |
|---|---|---|---|---|---|---|---|---|---|---|---|---|
| Sample No. | Mother material (100 parts) | Additive* Kind | Additive* Parts | Molding pressure (kg/cm$^2$) | Bulk density (g/cm$^3$) | Compression strength* (kg/cm$^2$) | Fixed carbon value (wt %) | Volume shrinkage (vol %) | Bulk density (g/cm$^3$) | Porosity (vol %) | Bending** strength (kg/cm$^2$) | zability d(002) A |
| Control 41 | b | LP | 15 | 600 | 1.29 | 178 | 64.0 | 45.1 | 1.514 | 3.7 | 1000 | 3.43 |
| 42 | b | PN | 15 | 600 | 1.28 | 193 | 64.0 | 45.1 | 1.501 | 4.4 | 930 | — |
| 43 | b | W | 15 | 600 | 1.28 | 210 | 63.8 | 45.6 | 1.502 | 4.1 | 970 | — |
| Control 44 | c | | 0 | 800 | 1.112 | 60 | 68.9 | 35.6 | 1.199 | 33.0 | 380 | 3.40 |
| 45 | c | KO | 15 | 600 | 1.31 | 175 | 56.0 | 45.4 | 1.430 | 16.0 | 790 | 3.42 |
| Control 45 | d | | 0 | 800 | 1.11 | 70 | 89.0 | 36.3 | 1.402 | 33.5 | 120 | 3.36 |
| 47 | d | PN | 15 | 600 | 1.24 | 151 | 79.0 | 52.0 | 1.679 | 11.1 | 1010 | 3.37 |
| 48 | d | EB | 15 | 600 | 1.25 | 145 | 75.0 | 56.0 | 1.690 | 11.3 | 980 | 3.37 |
| Control 49 | c | | 0 | 1000 | | | | Broken after molded | | | | |
| 50 | e | CO | 25 | 600 | 1.30 | 140 | 77.0 | 53.0 | 1.690 | 11.3 | 700 | 3.36 |

Note:
*PN: propylated nathphalene oil (mixture), liquid, average b.p. 350° C.
LP: Liquid paraffin
KO: light oil
CO: coal tar (fixed carbon ca. 10%)
W: synthetic wax
EB: ethylene bottom oil
**Compression tost: ASTM D 695 (Sample size: 1" × ½" × ½").
Bending test: ASTM D 790 (Sample size: ½" × ½" × 3")

The above-listed additives indicated fluidity at a temperature of at least 100° C., boiled or decomposed at a temperature of at least 150° C., and had a fixed carbon value of substantially 0% at 1000° C. when heated from room temperature at the rate of 10° C./min. in nitrogen.

As apparent from these tables, the additives displayed a distinct effect on the moldability and carbonizability of the samples. Baked moldings (for example, Samples 7 and 8) prepared under optimum conditions indicated a chemicals-impermeability well comparable with that of the prior art glassy carbon article. Further, the tables show that this invention made it possible for carbon articles to be manufactured with any desired degree of graphitization, namely, in various forms ranging from hard to soft according to the conditions in which the mother material was initially prepared.

EXAMPLE 2

Pitch having the following properties was prepared by heating coal pitch having a softening point of 77° C. at a temperature of 300° C. while introducing air to remove low boiling components.

| Flow temperature: | 257° C. |
|---|---|
| Analysis of elements: | 93.20% carbon |
| | 3.70% hydrogen |
| Quinoline insolubles: | 49.69 wt % |

The pitch thus prepared was pulverized to smaller particle sizes than 200 mesh. The resultant powders are chemically treated 30 minutes with an SN-HNO$_3$ solution at 40° C. Filtered solids were dried with hot air at 120° C., providing a mother material having the following properties:

| Flow temperature | The mother material did not flow out of the nozzle of the flow tester at 300° C. under a load of 10 kg/cm$^2$. |
|---|---|
| Analysis of elements: | 90.16% carbon } H/C 0.45 |
| | 3.37% hydrogen |
| | 5.29% oxygen |
| Fixed carbon value: | 80.34 wt % |

| -continued | |
|---|---|
| Quinoline insolubles: | 90.5 wt % |
| Benzene insolubles: | 100 wt % |

55 parts by weight of polyethylene glycol (average molecular weight 200; water content 20 wt%) were uniformly blended with 100 parts by weight of the above-mentioned mother material at room temperature using a Henschel mixer to provide a raw composition for carbon articles.

The raw composition was extruded into several round rods through a 300 mm diameter nozzle at a pressure of 300 kg/cm$^2$. One of the rods was baked and another was graphitized in an industrial furnace. The baked samples and graphitized sample displayed the properties set forth in Table 5 below.

TABLE 5

| | | Baked | Graphitized |
|---|---|---|---|
| Bulk density (g/cm$^3$) | | 1.54 | 1.69 |
| Porosity (vol %) | | 11.6 | 3.9 |
| Bending strength | ∥* | 870 | 815 |
| (kg/cm$^2$) | ⊥** | 863 | 799 |
| Shore hardness | ∥* | 121 | 89.1 |
| | ⊥** | 120 | 87.9 |
| Specific electric resistance | ∥* | — | 20.1 |

Note:
*Determination was made of a sample cut out parallel with the direction of extrusion.
**Determination was made of a sample cut out perpendicular to the direction of extrusion.

On the other hand, the remaining one of said non-baked round rods was machined into a ring 250 mm in outer diameter, 150 mm in inner diameter and 100 mm high. The ring was carbonized by heating up to 1400° C. in an industrial furnace. Determination was made of the physical properties of the ring.

Table 6

| | Outer diameter | Inner diameter | Height |
|---|---|---|---|
| Carbonization shrinkage (linear) % | 21.0 | 21.2 | 20.2 |
| Bulk density | | | |

Table 6-continued

|  |  | Outer diameter | Inner diameter | Height |
|---|---|---|---|---|
| Baked molding | (g/cm³) |  | 1.53 |  |
|  | Porosity (vol %) |  | 14.1 |  |
|  | Hardness (Shore) |  | 119 |  |

As seen from Tables 5 and 6, the raw composition of this invention was formed into a carbon article of excellent mechanical properties which indicated an isotropic carbonization shrinkage and retained a prescribed shape and size.

EXAMPLE 3

Powdery modified pitch was prepared by kneading pitch having a softening point of 150° C. which was obtained by removing low boiling components from asphalt, for 3 hours at 300° C. in the air using a kneader. The modified pitch thus prepared had the following physical properties:

| Analysis of elements: | 80.18% carbon | } H/C 0.70 |
|---|---|---|
|  | 4.67% hydrogen |  |
|  | 0.46% nitrogen |  |
|  | 7.62% sulfur |  |
|  | 7.0% oxygen |  |
| Fixed carbon value: | 77.59% |  |
| Quinoline insolubles: | 89% |  |
| Benzene insolubles: | 99% |  |

The modified pitch was pulverized to smaller particle sizes than 300 mesh to form a mother material. 100 parts by weight of powders of said mother material, 10 parts by weight of spindle oil (fixed carbon value 0%) and 10 parts by weight of glycerine were uniformly mixed in a blender to provide a raw composition for a carbon article. The composition was molded at room temperature into a parallelepiped body measuring 300 mm×300 mm×50 mm at a pressure of 800 kg/cm² and carbonized at 1400° C. in an industrial furnace. The baked body had the following properties:

| Bulk density (g/cm³): | 1.43 |
|---|---|
| Porosity (vol %): | 13 |
| Bending strength ⊥ (kg/cm²): | 730 |
| Shore hardness: | 115 |

What we claim is:

1. A method for preparing a homogeneous and low porosity carbon article of great mechanical strength comprising:
   (I) shaping into a desired form a composition comprising:
   a sinterable mother material which is in fibrous, powder or particulate form, and which (i) is a polycyclic aromatic compound obtained from tar or pitch, (ii) has a H/C atomic ratio of from 0.3 to 0.75, (iii) a fixed carbon value of 55 to 96%, (iv) does not flow out of a 1 mm diameter nozzle under an applied load of 10 kg/cm² at 300° C., (v) benzene insolubles of more than 90%, and (vi) is capable of being sintered together without deformation while baking; and
   an additive, in an amount sufficient to improve the workability and carbonization characteristics of said mother material, selected from the group consisting of: (i) a hydrocarbon, (ii) a fatty acid, an ester or metal salt thereof, (iii) an organic compound having a OH functional group in the molecule, and (iv) mixtures thereof, the additive having a maximum fixed carbon value of 20%, a boiling or decomposition point of at least 150° C., and becoming fluid at a temperature of at least 1,000° C., wherein said hydrocarbon (i) is selected from the group consisting of a liquid paraffin, a lubricating oil, a light oil, a coal tar, naphthalene, an alkyl naphthalene, an anthracene oil and a bottom oil by-product in the manufacture of olefins; said fatty acid (ii) is selected from the group consisting of lauric acid, myristic acid, palmitic acid, stearic acid and oleic acid; and said organic compound (iii) is selected from the group consisting of ethylene glycol, propylene glycol, glycerine, cyclohexanol, lauryl alcohol, decyl alcohol, cetyl alcohol, polyethylene glycol, polypropylene glycol and polyvinyl alcohol; and
   (II) baking the shaped composition at a temperature of at least 1,000° C. to sinter and fuse together said mother material and to carbonize or graphitize the composition in a nonoxidizing atmosphere, thereby providing a homogeneous and low porosity carbon article of great mechanical strength.

2. A method according to claim 1, wherein said mother material is obtained from tar or pitch by distillation.

3. A method according to claim 1, wherein said mother material is obtained from tar or pitch by thermal or catalytic polycondensation.

4. A method according to claim 1, wherein said mother material is obtained from tar or pitch by thermal polycondensation carried out at 350° C. to 550° C.

5. A method according to claim 1, wherein said mother material is obtained from tar or pitch by oxidation.

6. A method according to claim 1, wherein said mother material is obtained by solvent extraction of said tar or pitch.

7. A method according to claim 1, wherein said additive is incorporated in said composition in an amount of from 3 to 60 parts by weight based on 100 parts by weight of said mother material.

8. A method according to claim 1, wherein said shaping is conducted by cast molding.

9. A method according to claim 8, wherein said additive is incorporated in said composition in an amount of from 3 to 35 parts by weight based on 100 parts by weight of said mother material.

10. A method according to claim 1, wherein said shaping is conducted by extrusion molding.

11. A method according to claim 10, wherein said additive is incorporated in said composition in an amount of from 35 to 60 parts by weight based on 100 parts by weight of said mother material.

12. A method according to claim 1, wherein said additive is a hydrocarbon and is a bottom oil by-product in the manufacture of ethylene.

13. A method according to claim 1, wherein said additive is selected from the group consisting of lauric acid, myristic acid, palmitic acid, stearic acid and oleic acid.

14. A method according to claim 1, wherein said additive is polyethylene glycol having an average molecular weight of 400.

15. A method according to claim 1, wherein said additive is stearic acid.

16. A method according to claim 1, wherein said carbonization or graphitization is carried out at a temperature of from 1,000° C. to 2,800° C.

17. A method according to claim 1, wherein said baking includes the step of sintering together said mother material in said composition without deformation.

* * * * *

UNITED STATES PATENT AND TRADEMARK OFFICE
CERTIFICATE OF CORRECTION

PATENT NO. : 4,226,633

DATED : October 7, 1980

INVENTOR(S) : Kiro Asano, et al.

It is certified that error appears in the above-identified patent and that said Letters Patent is hereby corrected as shown below:

Column 1, line 42, replace "mesocarbo" with --mesocarbon--
       line 50, replace "stae" with --stage--
       line 54, replace "most" with --meet--

Column 2, line 6, replace "N/C" with --H/C--

Column 3, line 67, replace "nonoxiding atomsphere" with --nonoxidizing atmosphere--
       line 68, replace "grahitization" with --graphitization--

Column 4, line 26, replace "avaiable" with --available--

Columns 5-6, Table 2, second column (under "Mother material"):
   at "Control 7", "a*" should read --a--
Columns 5-6, Table 2, second column (under "Mother material"):
   at "Control 16", "c" should read --e--
Columns 5-6, Table 2, sixth column (under "Molded Bulk density"
   at "Control 2", "1.034" should read --1.084--

# UNITED STATES PATENT AND TRADEMARK OFFICE
CERTIFICATE OF CORRECTION

PATENT NO. : 4,226,633

DATED : October 7, 1980

INVENTOR(S) : Kiro Asano, et al.

It is certified that error appears in the above-identified patent and that said Letters Patent is hereby corrected as shown below:

Columns 5-6, Table 2, sixth column (under "Molded Bulk density")
   at "Control 13", "1.25" should read --1.28--
Columns 5-6, Table 2, eighth column (under "Fixed carbon value")
   at "Control 1", "71.2" should read --74.2--
Columns 5-6, Table 2, ninth column (under "Volume shrinkage"):
   at "Control 10", "14.8" should read --44.9--
Columns 5-6, Table 2, tenth column (under "Baked Bulk density"):
   at "Control 6", "1.40" should read --1.49--
Columns 5-6, Table 2, twelfth column (under "Bending strength"):
   at "Control 11", "390" should read --380--

Column 6, Table 1, third column (under "C"): at "Sample d",
   "94.32" should read --94.92--
Column 6, Table 1, third column (under "C"): at "Sample e",
   "95.21" should read --95.24--

UNITED STATES PATENT AND TRADEMARK OFFICE
CERTIFICATE OF CORRECTION

PATENT NO. : 4,226,633

DATED : October 7, 1980

INVENTOR(S) : Kiro Asano, et al.

It is certified that error appears in the above-identified patent and that said Letters Patent is hereby corrected as shown below:

Columns 7-8, Table 2, second column (under "Mother material"):
   at "Control 17", "c" should read --e--
Columns 7-8, Table 3, second column (under "Mother material"):
   at "Control 32", "a" should read --e--
Columns 7-8, Table 3, third column (under "Additive kind"):
   at "Control 26", "SA" should read --MA--
Columns 7-8, Table 3, third column (under "Additive kind"):
   at "Control 29", "PA" should read --RA--
Columns 7-8, Table 3, fifth column (under "Molding pressure"):
   at "Control 22", "600" should read --800--
Columns 7-8, Table 3, seventh column (under "Compression strength"): at "Control 18", "10" should read --40--
Columns 7-8, Table 3, seventh column (under "Compression strength"): at "Control 33", "118" should read --148--
Columns 7-8, Table 3, eighth column (under "Fixed carbon value") at "Control 30", "39.0" should read --89.0--

UNITED STATES PATENT AND TRADEMARK OFFICE
CERTIFICATE OF CORRECTION

PATENT NO. : 4,226,633

DATED : October 7, 1980

Page 4 of 6

INVENTOR(S) : Kiro Asano, et al.

It is certified that error appears in the above-identified patent and that said Letters Patent is hereby corrected as shown below:

Columns 7-8, Table 3, ninth column (under "Volume shrinkage"):
   at "Control 26", "65.1" should read --45.1--
Columns 7-8, Table 3, ninth column (under "Volume shrinkage"):
   at "Control 29", "15.3" should read --45.3--
Columns 7-8, Table 3, tenth column (under "Baked Bulk density"):
   at "Control 31", "1.654" should read --1.664--
Columns 7-8, Table 3, eleventh column (under "Porosity"):
   at "Control 29", "15.1" should read --15.4--
Columns 7-8, Table 4, eighth column (under "Fixed Carbon value"): at "Control 34", "7.42" should read --74.2--
Columns 7-8, Table 4, thirteenth column (under "Graphitizability"): at "Control 34", "3.41" should read -- - --
Columns 7-8, Table 4, thirteenth column (under "Graphitizability"): at "Control 35", "-" should read --3.41--

UNITED STATES PATENT AND TRADEMARK OFFICE
CERTIFICATE OF CORRECTION

PATENT NO. : 4,226,633

DATED : October 7, 1980

INVENTOR(S) : Kiro Asano, et al.

It is certified that error appears in the above-identified patent and that said Letters Patent is hereby corrected as shown below:

Column 8, line 21, replace "above-listed additives" with
--additives listed in Table 3--

Columns 9-10, Table 4, first column (under "Sample No."):
at "Control 45", "Control 45" should read --Control 46--

Columns 9-10, Table 4, second column (under "Mother material"):
at "Control 49", "c" should read --e--

Columns 9-10, Table 4, eleventh column (under "Porosity"):
at "Control 47", "11.1" should read --11.4--

Columns 9-10, Table 4, twelfth column (under "Bending strength")
at "Control 46", "120" should read --420--

Column 9, line 26, replace "above-listed additives" with
--additives listed in Table 4--
line 56, replace "SN-$HNO_3$" with --8N-$HNO_3$--

Column 12, line 9, replace "1,000°C" with --100°C--

UNITED STATES PATENT AND TRADEMARK OFFICE
CERTIFICATE OF CORRECTION

PATENT NO. : 4,226,633

DATED : October 7, 1980

INVENTOR(S) : Kiro ASANO et al.

It is certified that error appears in the above-identified patent and that said Letters Patent is hereby corrected as shown below:

Columns 7-8, Table 3, fifth column (under the heading "Molding pressure") and on the horizontal line corresponding to Sample No. 29: the number "300" should read --800--.

Signed and Sealed this

Fourth Day of March 1986

[SEAL]

Attest:

DONALD J. QUIGG

Attesting Officer

Commissioner of Patents and Trademarks